United States Patent
Stineman (10) Patent No.: US 10,654,045 B2
(45) Date of Patent: May 19, 2020

(54) WINCHING CHIPPER

(71) Applicant: Robert Stineman, Astoria, OR (US)

(72) Inventor: Robert Stineman, Astoria, OR (US)

( * ) Notice: Subject to any disclaimer, the term of this patent is extended or adjusted under 35 U.S.C. 154(b) by 498 days.

(21) Appl. No.: 15/459,174

(22) Filed: Mar. 15, 2017

(65) Prior Publication Data

US 2018/0264480 A1    Sep. 20, 2018

(51) Int. Cl.
| | |
|---|---|
| *B02C 23/02* | (2006.01) |
| *B27L 11/02* | (2006.01) |
| *B66D 1/74* | (2006.01) |
| *A01G 23/00* | (2006.01) |

(52) U.S. Cl.
CPC .............. *B02C 23/02* (2013.01); *B27L 11/02* (2013.01); *B66D 1/7415* (2013.01); *B66D 1/7489* (2013.01); *A01G 23/003* (2013.01)

(58) Field of Classification Search
CPC ....... B02C 23/02; B27L 11/02; B66D 1/7415; B66D 1/7489; A01G 23/003
See application file for complete search history.

(56) References Cited

U.S. PATENT DOCUMENTS

| | | | | |
|---|---|---|---|---|
| 3,352,508 A * | 11/1967 | Hadley | ................. | A01G 23/003 212/89 |
| 3,499,544 A * | 3/1970 | Kolpe | ................. | A01G 23/003 212/71 |
| 3,651,952 A * | 3/1972 | Mitchell | ................. | B66C 21/00 212/84 |
| 4,102,528 A * | 7/1978 | Cripe | ................... | A01G 23/006 212/167 |
| 4,398,581 A * | 8/1983 | Aikins | ...................... | B27L 7/00 144/195.1 |
| 4,529,350 A * | 7/1985 | Jones | ................... | A01G 23/006 414/494 |
| 5,010,933 A * | 4/1991 | Doyle | ................... | A01G 23/006 144/336 |
| 5,088,532 A * | 2/1992 | Eggers | ................... | B27L 11/002 144/176 |
| 5,722,640 A * | 3/1998 | Skyba | ................... | B66D 1/7415 254/333 |
| 6,138,991 A * | 10/2000 | Myers, Jr. | ............... | B66C 23/44 212/180 |
| 6,446,889 B1 * | 9/2002 | Moore | ................... | A01G 3/002 241/101.76 |
| 7,562,837 B2 * | 7/2009 | Brand | ..................... | A01G 3/002 241/101.2 |
| 7,819,348 B2 * | 10/2010 | Bouwers | ............. | B02C 18/2225 241/101.76 |
| 9,233,375 B2 * | 1/2016 | Kennedy | ................. | B02C 25/00 |

(Continued)

*Primary Examiner* — Omar Flores Sanchez
(74) *Attorney, Agent, or Firm* — Mark S Hubert (57) ABSTRACT

A winching apparatus adapted for horizontal rotational mounting behind the chipping feed rollers on a chipping machine. It has a rotatable vertical stanchion, that is pivotally coupled to first end of a horizontal boom arm that may be vertically adjusted between its ends so as to raise or lower its second end. At the second end of the boom arm is a swivel mounted plate that houses a high speed continual line uptake winch that is thus adjustable for simultaneous alignment of the rope puller with the line in both the horizontal and vertical planes. The device is capable of compensating for a constantly changing directional pull as well as feeding the downed foliage directly into the chipper.

15 Claims, 8 Drawing Sheets

(56) References Cited

U.S. PATENT DOCUMENTS

| | | | |
|---|---|---|---|
| 9,656,269 B2* | 5/2017 | Kennedy | B02C 25/00 |
| 2007/0104560 A1* | 5/2007 | Hall | B60P 1/483 |
| | | | 414/494 |
| 2016/0030945 A1* | 2/2016 | Kennedy | B02C 25/00 |
| | | | 241/28 |
| 2016/0030946 A1* | 2/2016 | Kennedy | B02C 25/00 |
| | | | 241/28 |
| 2016/0297651 A1* | 10/2016 | Timmermans | B66D 1/7415 |
| 2018/0147421 A1* | 5/2018 | Ogura | A62B 1/06 |

* cited by examiner

WINCHING CHIPPER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the wood chipping industry, and more particularly to a device to greatly speed up the retrieval of trees, brush and foliage to a wood chipper.

BACKGROUND

Wood chippers have been around in various physical formats for decades. Generally, these devices have attached winches to help drag the downed trees, brush or foliage to the area in front of the chipper, where they can be manually uncoupled and fed into the chipper for grinding. The problem with the prior art devices is that they utilize drum reel winches which are fixed in their location and they are limited in the speed of takeup, their payout (length of cable), their ability to take in knotted cable, and their angle of pull. This severely impacts the amount of time conventional drum reel winches take to complete a job as well as their capability for handling different cutting, retrieval and grinding operations.

Henceforth, an improved winching system that may be used to quickly retrieve any length of line that was payed out, can be adapted for various retrieval operations and that can feed retrieved foliage directly into the grinder, would fulfill a long felt need in the wood chipping industry. This new invention utilizes and combines known and new technologies in a unique and novel configuration to overcome the aforementioned problems and accomplish this.

BRIEF SUMMARY

In accordance with various embodiments, a winching apparatus adapted for horizontal rotational mounting on a chipping machine, that provides for adjustment in the vertical plane and that has a high speed continual line uptake winch that is capable of pivotal self alignment in both the vertical and horizontal planes to compensate for a constantly changing directional pull, is provided.

In one aspect, a chipping machine with a winching apparatus positioned behind the grinder feed rollers, configured to both retrieve an unlimited length of payout winch line and that is capable of raising the retrieved foliage for insertion into the chipping chamber, is provided.

In another aspect, a continual feed, self aligning high speed winching apparatus capable of being retrofitted onto a chipping machine behind the chipper chamber is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein the term "winch" refers to a mechanical device that can retrieve or dispense rope or cable to or from them, through the exertion of a mechanical force ("winching"). Generally, these winches are driven electrically, pneumatically, hydraulically or by direct coupling with an engine (as in the case of a power take off option). The most common conventional winches are drum style winches that store a limited length of rope or cable (the payout) coiled about a reversibly driven cylindrical drum.

As used herein the term "continual uptake or continual line uptake" refers to the ability for a winch to continually retrieve or dispense rope or cable lines of an unlimited length, (unlimited payout) unhampered by the amount of rope or cable that it has handled. Winches of this type are commonly referred to as "rope pullers", since their principle of operation functions best and minimizes line slippage with a compressible medium (rope) rather than an incompressible medium (steel cable). These type of devices do not store the rope or cable that they retrieve or dispense, although they generally deposit it in an auxiliary, nearby container or area. Alternately, they may continually circulate a loop of rope.

As used herein the term "line" refers to a length of rope or cable.

As used herein, the term "payout" refers to a length of line fed from a winching device (such as the chipping machine) for subsequent retrieval by the winching device. In a conventional drum style winch the length of this line is limited by the operational diameter of the drum since the rope does not pass directly through the winch as it does in the case of a rope puller winch.

As used herein, the term "boom" refers to a linear member used for lifting or pulling loads via a device attached at its end. It may or may not be able to controllably extend its length or its angle so as to improve control of the path (angle of approach) to the work that the device on the boom has. Booms can be of lattice construction or heavy tubular material. When coupled to a crane it is termed a boom crane. When coupled to a winch it is termed a boom winch.

As used herein, the term "self-aligning" refers to the ability of the boom arm or the rope puller to be able to pivot/rotate to achieve the optimal path between the rope at the end of the rope puller and the load attached at the distal end of the rope (generally the shortest or straightest line) for the vertical position that the The present invention relates to a novel design for a vertically adjustable, radially pivotable, self aligning boom coupled to a high speed, continual line uptake, vertically swiveling self-aligning winch, ("boom winch") that is rotationally mounted on a chipping machine behind the chipping machine's grinder feed rollers. (Hereinafter "chipper winching apparatus".) It is critical that the type of winch utilized is a continual rope puller and not a drum of fixed payout winch. This specific configuration offers a plethora of operational advantages over conventional chippers that have not been seen in the industry and that offers major reductions in the working time to complete a chipping job as will be discussed herein. It may be offered as a complete winching chipper or as a boom winching unit designed to be retrofitted onto a conventional chipper.

Chippers generally are brought to the worksite to grind up and dispense the foliage that is cut down. Many conventional chippers utilize drum style winches mounted at the rear to help drag larger trees and brush to the back of the chipper. These drum winches are very limited to what they can do because of their limited payout and slow speed. In contrast, the winching system of the present invention is used in all stages of tree cutting, hauling and grinding. Conventional, commercial chippers have a wheeled trailer 4 made of a perimeter of steel members having a planar platform affixed there between, upon which the remainder of the chipper components are mounted. The chipper is powered by a combustion engine 6 that is rotationally coupled to a hydraulic unit 8 comprised of a reservoir tank, pump, control valves and fluid lines as is well known in the industry. At the front end of the chipper is a grinder unit 99 made up of a grinder chute 17 having a grinder jaw ram and set of internal feed rollers and grinding wheels (not illustrated for visual clarity), all of which are hydraulically driven. There is a discharge chute 20 at the rear of the grinder unit 99 that forcefully discharges the ground bits of foliage that have been processed by the grinder via a spinning discharge impeller.

It is quite common to outfit commercial chippers with non-adjustable, front mounted drum winches to retract downed foliage. These drum winches serve but this single purpose because they have limited payouts and a slow speed feed because of their spatial line winding onto their drum. They are not self aligning although this is not a necessary feature since they drag foliage in a short but straight line. They also are not vertically or horizontally adjustable.

The present winching chipper allows the mass of the chipper to serve as an anchor point for numerous high tension, high speed pulling and lifting actions that heretofore have not been able to be accomplished by conventional chippers coupled to drum winches. The boom winch is designed to help cut or remove the foliage as well as retrieve it when downed and feed the foliage directly into the grinder chute. These type of tasks have not been able to be accomplished because of the slow speed, directional pull and limited payout of the drum winches coupled to chippers. The operational benefits of the winching chipper will discussed after an explanation of its structure and operation.

Looking at FIGS. 1-6 the components of the winching chipper 2 can best be seen. It is a conventional chipper unit that has boom winch unit mounted and operationally connected to the chipper and its hydraulic system 8. The boom winch unit has a boom winch rotationally mounted onto the chipper's trailer 4 by a boom mast 10 located behind the grinder chute 17, grinder jaw ram, and its internal feed rollers (not illustrated).

Figure 1:
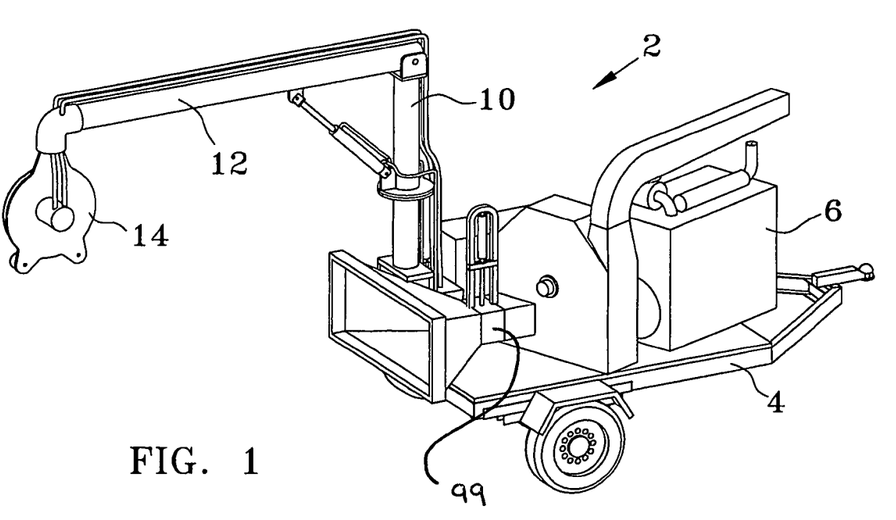
FIG. 1 is a right side perspective view of the winching chipper.
Figure 2:
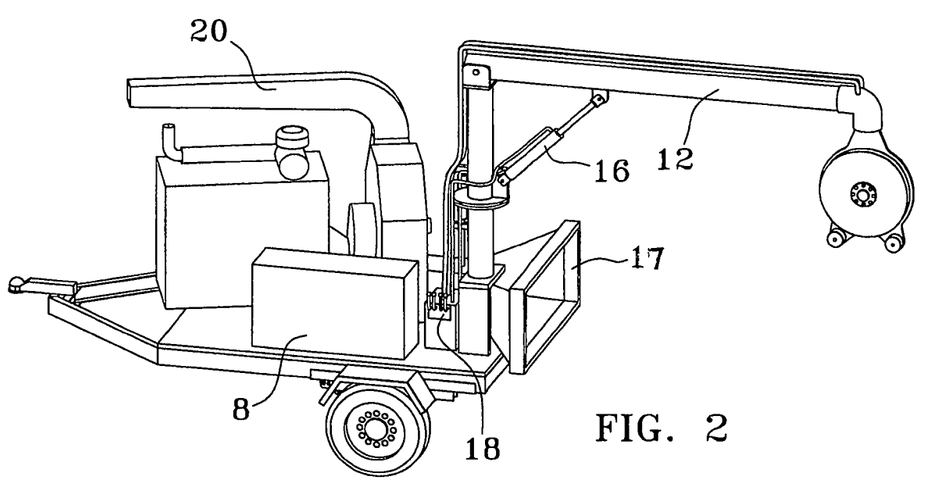
FIG. 2 is a left side perspective view of the winching chipper.
Figure 3:
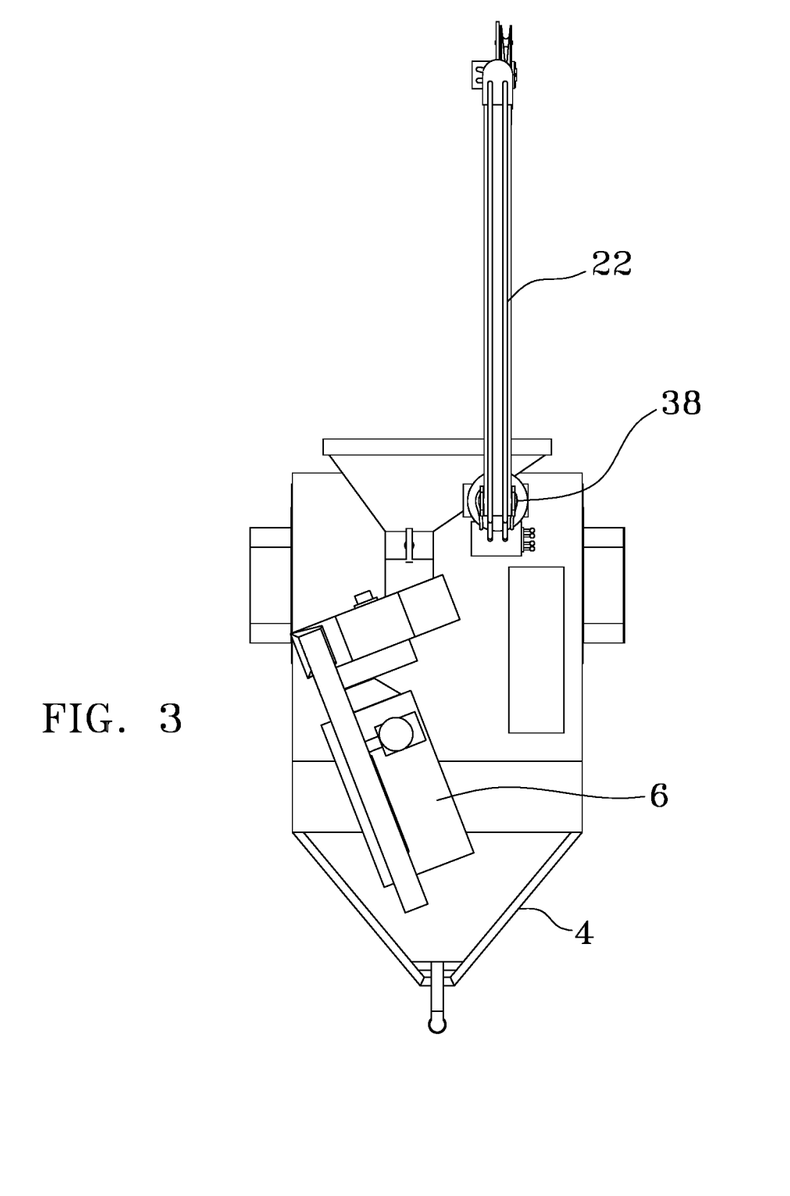
FIG. 3 is a top view of the winching chipper.

The boom arm 12 is a rigid linear member pivotally affixed for angular vertical movement to the top of the boom mast 10 such that its length extends out beyond the front of the grinder feed chute 17. On the proximal end of the boom mast 12 is a rope puller 14 that is mounted so as to be able to freely swivel horizontally to the right and left under the direction of the rope tension vectors. Diagonally between the boom arm 12 and the boom mast 10 is a remote controlled double acting hydraulic ram 16. The ram 16 may be remotely extended to vertically raise the proximal end of the boom arm 12 or remotely retracted to vertically lower the proximal end of the boom arm 12 by a winch control panel 18 (FIG. 2). The ram 16 and rope puller 14 are both hydraulically powered by the chipper's hydraulic unit 8 but operated by a dedicated winch control panel 18, separate from the control panel used for the operation of the grinder feed rollers and grinder. Both the hydraulic lines for the operation of the ram 16 and for the operation of the rope puller 14 are illustrated as being routed along the outer surface of the boom mast 10 and the boom arm 12 although these hydraulic lines 22 may also be routed through the internal voids of the tubes used for the boom mast 10 and the boom arm for visual aesthetics. (FIG. 3)

Figure 4:
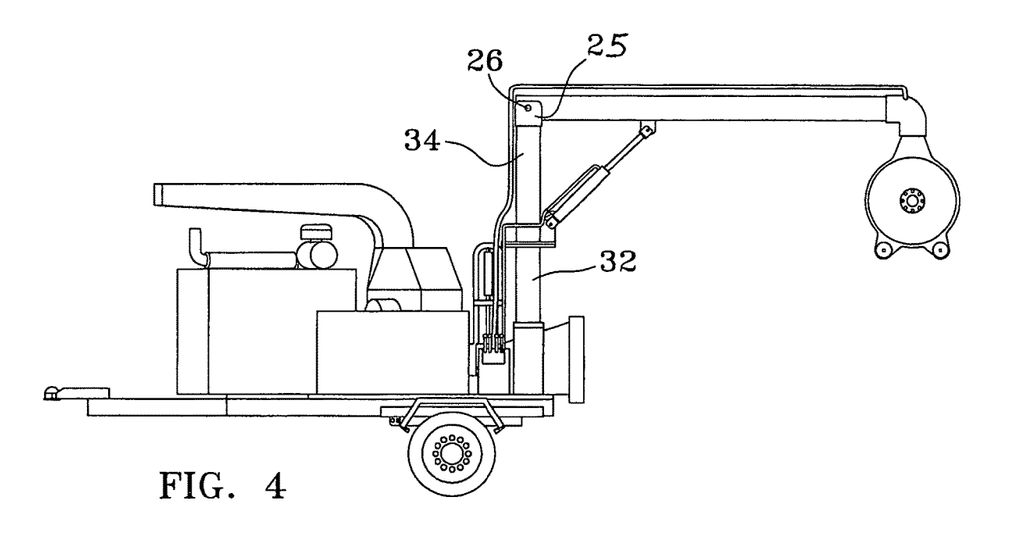
FIG. 4 is a left side view of the winching chipper.
Figure 5:
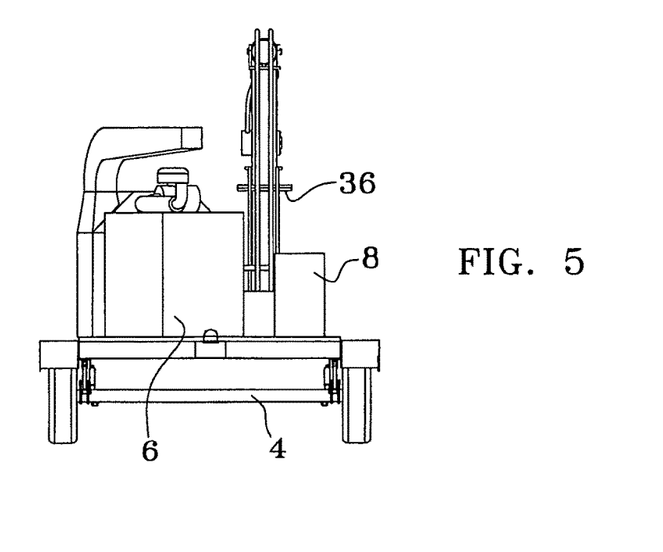
FIG. 5 is a rear view of the winching chipper.
Figure 6:
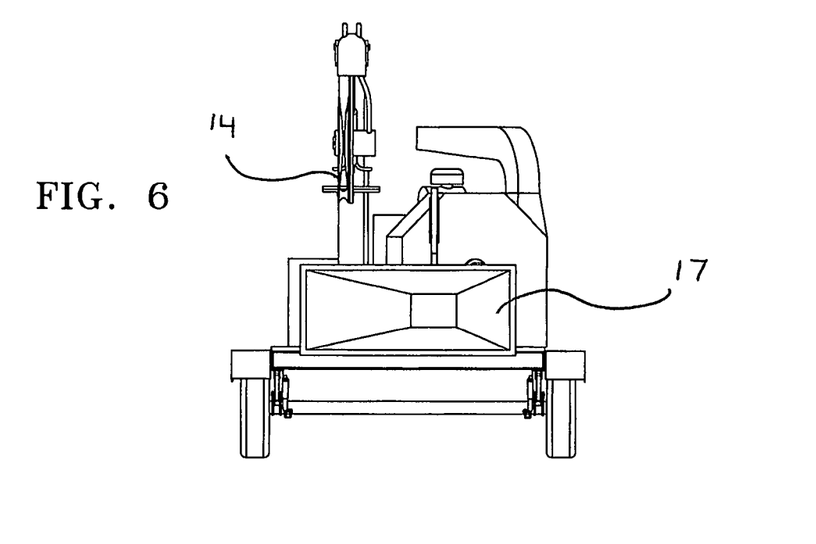
FIG. 6 is a front view of the winching chipper.

The three pivotal connections between the distal end of the ram 16 and the boom mast 10, the proximal end of the ram 16 and the boom arm 12, and the distal end of the boom arm 12 and the top of the boom mast 10, are all basic mechanical, pivotal connections. Each pivotal connection has a pair of parallel flanges (each having aligned first orifices) that extend normally from the first component. Between the parallel flanges resides the second component also having an orifice. The three orifices are aligned and a circular cross section is removeably inserted through the orifices such that the second component is free to pivot about the longitudinal axis of the pin. This can be seen with the flanges 25 and pin 26 of the pivotal connection between the distal end of the boom arm 12 (second component) and the top of the boom mast 10 (first component) (FIG. 4).

The boom mast 10 (FIG. 1) is a linear member made of an upper boom mast 34 and a lower boom mast 32. (FIG. 4) The lower boom mast is rigidly mounted to the trailer 4 and has a circular lower flange 36 (FIG. 5) extending normally from its top end. The upper boom mast 34 has a mating circular upper flange 38 (FIG. 3) extending normally from its lower end. These two flanges act to stabilize the vertical motion of the upper boom mast 34 when experiencing an applied vector force from the rope puller 14. Secondarily, the upper flange 38 serves as an anchor for the mounting of the parallel flanges of the pivot connection between the distal end of the ram 16 and the boom mast 10. The upper boom mast 34 is free to pivot radially about the common vertical axis of the boom mast 10 and the lower boom mast 32. There are a great number of ways the upper and lower boom masts may be connected and rotationally enabled as is well known in the industry. Preferably, there is a stiffing tube extending into the inner voids of each of the upper and lower boom masts with an operational clearance between its outer surface and the inner surface of the boom masts. Optionally, at least on bearing may be incorporated into this design as is well known in the industry.

It is to be noted that the ram 16 may be eliminated in an alternate embodiment removing the ability for the operator to raise of lower the rope puller. With the mast still able to pivot or rotate and the rope puller able to swivel the unit will still function but with a much limited operational rope angle.

Onto the upper end of the upper boom mast 34 is mounted a boom arm 12 that is vertically pivotally by the action of a double acting ram 16 affixed between the bottom end of the upper boom mast and the boom arm 12. Thus, with the ability of the upper boom mast 34 to freely pivot radially about the common vertical axis of the boom mast 10, the boom arm 12 is capable of pivoting in both the horizontal and vertical planes.

Figure 7:
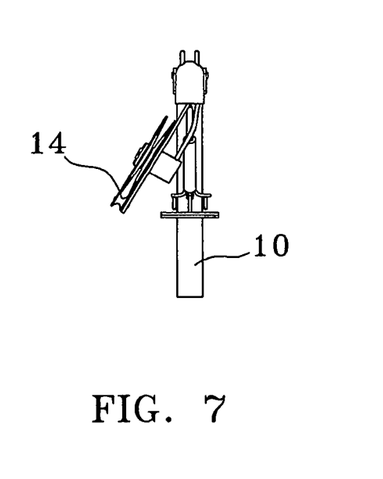
FIGS. 7 and 8 are front views of the boom winch showing its sideways swivel alignment feature.
Figure 8:
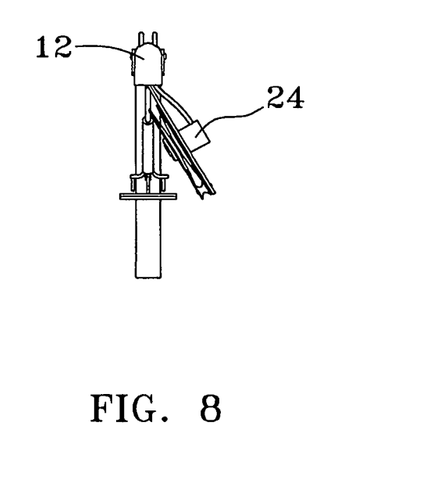

The rope puller 14 is vertically, swivelly mounted on the proximal end of the boom mast 12 so as to axially rotate to the left (FIG. 7) and right (FIG. 8) about the linear axis of the boom arm 12. There is enough slack left in the attachment of the hydraulic lines 22 between the proximal end of the boom arm 12 and the rope puller motor 24 to avoid abrasion and distortion of these lines as the rope puller 14 swivels from side to side. The swivel connection can be made by various mechanical means, although the preferred embodiment involves a bearing (plain, roller or ball) positioned between the proximal end of the boom mast 12 and the top of the rope puller 14 as would be well known in the industry. The vector forces of the rope 30 will dictate the vertical angle of the rope puller 14 on the boom arm 12 as well as the rotational angle of the upper boom mast 34 with respect to the lower, fixed boom mast 32 (FIG. 4).

Figure 14:
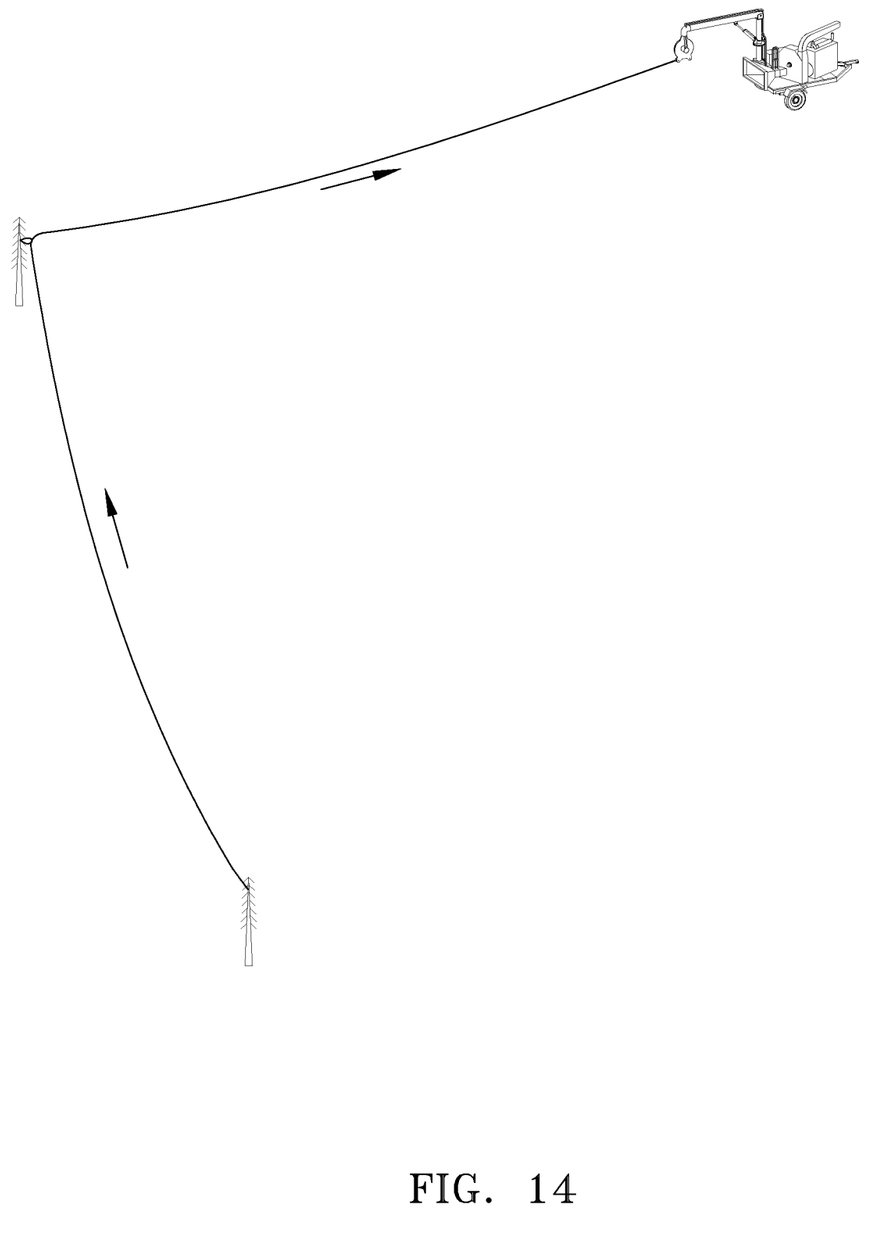
FIG. 14 is a a representative view of the winching chipper using snatch blocks anchored to trees to improve the chipper's boom winch angle of attack on the work.

The effect of having the upper mast 34 able to freely pivot radially in a horizontal plane while the rope puller 14 can freely swivel horizontally at the same time the boom mast 12 is remotely raised and lowered, is that the best line of approach between the work and the chipper can always be established. When the position of the chipper at the worksite is at an unfavorable angle to the work, or is at an extreme distance from the work, the unlimited length of rope that can be handled by the rope puller will always allow the operator to be able to connect to the foliage. To correct the angles, at least one snatchblock may be attached to at least one anchor point (such as the trunk of a nearby tree) to change the angle from the chipper and to get the rope around any obstacles between the chipper and the work. In this way the best line of approach can always be used, and more importantly, established very quickly as the pay out of the rope is essentially unlimited and need not be spooled from the winch drum. (FIG. 14)

It is to be noted, that because of the high speed the rope puller can pass rope, once the rope is attached to the tree to be downed/trimmed, constant tension can be maintained on the rope to help pull away the foliage as it is cut. In fact, where sections of high foliage are being cut from a tree by a tree trimmer that has scaled the tree, the rope uptake and rope tension is sufficient to dislodge the cut foliage from the tree as soon as it has been severed, safely distancing it from the tree trimmer and directing its landing position. The chipper operator is controlling the pulling angle by raising and lowering the winch boom as well as controlling the amount of tension the rope puller exerts on the rope and work.

Placing the boom winch behind the grinder feed chute 17 with the boom arm above and extending beyond the front edge of the chute 17 allows the rope puller to drag foliage directly to the grinder. The dragged foliage can then be choked higher and raised above the chute 17 such that the leading butt of the foliage can be directly feed into the feed rollers of the grinder. Moving the choke further down the foliage then allows the foliage to be fed into the grinder or raised for feed into the grinder.

The rope puller 14 and the ram 16 as well as the grinder chute feed ram, grinder feed rollers and the grinder are all hydraulically driven by the chipper's hydraulic system 8. The winch has its own winching hydraulic system but this is comprised of the operational plumbing, valves and control panel. These systems have shared components that include the reservoir tank and the hydraulic pump. However, it is to be noted that the grinder and the boom winch are operated by separate remote control stations. This serves two purposes. It allows the boom winch unit to be retrofitted onto any manufacturer's chipper and it also prevents the inadvertent operation of the grinder and the boom winch at the same time. This prevents the inadvertent feed of rope into the grinder unit when the rope puller is used to feed foliage directly into the grinder chute.

Figure 10:
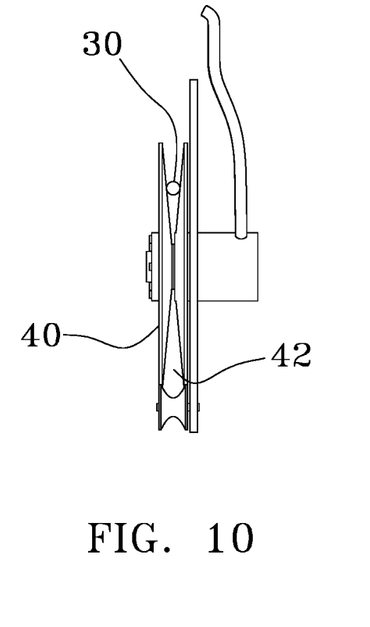
FIG. 10 is a front view of the rope puller.
Figure 11:
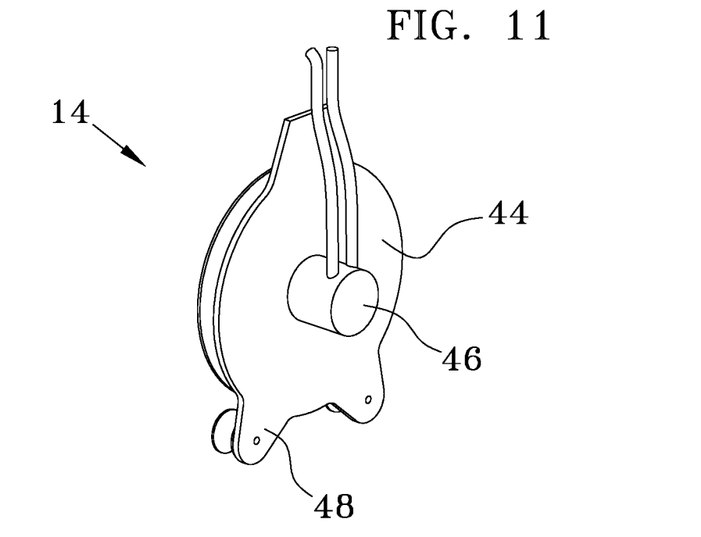
FIG. 11 is a side perspective view of the rope puller
Figure 12:
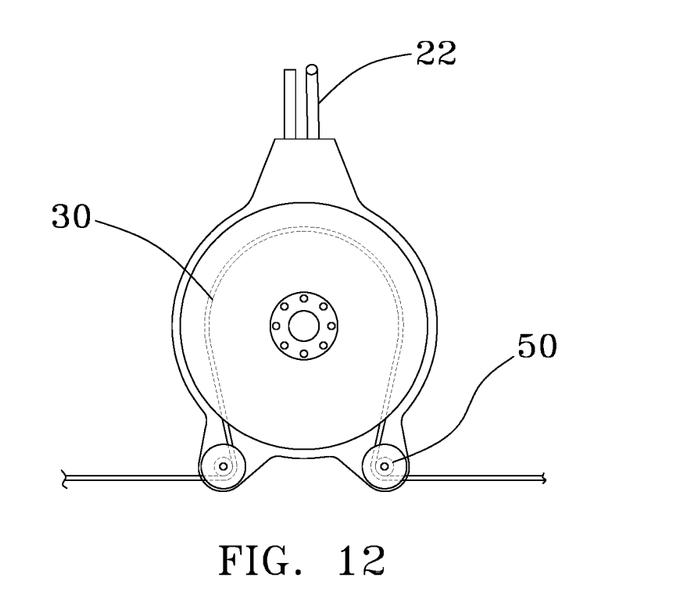
FIG. 12 is a side view of the rope puller showing a phantom rope.

Looking at FIGS. 10-12 it can be seen that the rope puller 14 consists of a pair of identical circular steel convex disks 40 conjoined about their midpoints such that their convex sides are opposing. Between the two disks is formed a "Vee" shaped trough 42 narrowing in taper from the outer perimeter to the approximate center. The distance between the outer edges of the two disks at the outer perimeter exceeds the thickness of the rope 30 and the distance between the disks at the bottom of the "Vee" is much smaller than the diameter of the rope 30. The conjoined disks 40 are mounted on a planar backing plate 44 that houses about its center a hydraulic motor 46 that is operationally connected to the hydraulic system 8 of the chipper via lines 22. The hydraulic motor 46 revolves a shaft affixed to the conjoined disks 40 at a speed and with an amount of pulling torque that increases with the flow of hydraulic fluid to the motor 46. This is regulated at the boom winch control panel 18 by the chipper operator. At the bottom of the backing plate 44 are a pair of ears 48 that serve as mounting surfaces for a pair of opposing rope pulleys 50. The rope 30 is wound around the trough 42 between the conjoined disks 40 from the top and then around the inside of each pulley 50. The distance between the inside grooves of each of the pulleys 50 is less than the distance between the rope 30 in the trough 42 taken at the horizontal centerline of the conjoined disks 40.

With this design the rope 30 is forced down into the tapering "Vee" of the trough 42 at a depth that frictionally engages the rope. As the disks are hydraulically rotated, the rope 30 is pulled along its length past the first pulley, around approximately 300 degrees of the conjoined disk and past the second pulley. As the load on the rope 30 increases, the rope is forced deeper into the "Vee" thus increasing the frictional engagement such that the rope is continually pulled. Additional hydraulic fluid and pressure will drive the winch to either revolve faster (pulling more rope) or increase the tension on the rope 30. This transfer of hydraulic energy is instantaneous, and is split between speed and torque. The higher the speed component, the lower the torque component. The lower the speed component the higher the torque component. This combination of speed and torque is what allows the winching chipper to to tension and bend a tree to be cut and then to instantaneously yank it out of the area (or tree it is cut from) instantaneously as the cut is completed. The top end of the backing plate 44 is connected for horizontal swivel to the proximal end of the boom arm 12.

It is to be noted that the ram 16 and the winch 44 may be hydraulically driven in either direction. That is to say they are both reversible by the selection of hydraulic flow control valves located at the winch control panel 18. The flow control valves allow for not only the reversal of flow direction through the ram 16 and the winch, but allow for the adjustable control of the hydraulic flow in either direction.

Figure 13:
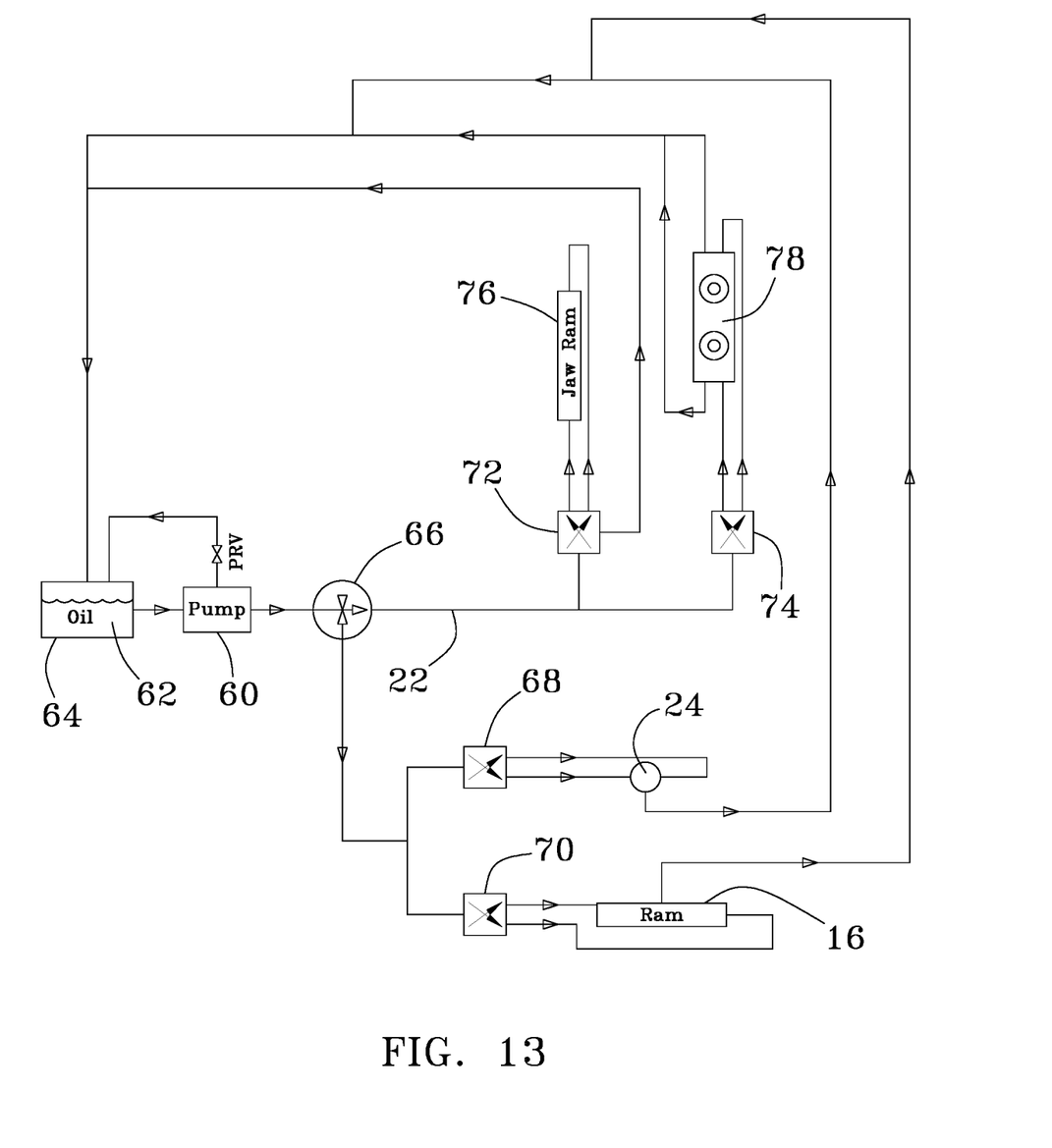
FIG. 13 is a schematic view of the hydraulic system for the winching chipper.

Looking at FIG. 13 the hydraulic operation of the winching chipper can best be explained. A hydraulic pump 60 driven by the chipper's combustion engine 6 draws hydraulic fluid 62 from the oil reservoir 64 and sends it down the hydraulic lines 22 to the control panels and equipment having both a pressure and a flow. The hydraulic system is a closed loop system such that the hydraulic fluid 62 always returns to the reservoir 64 after it has passed through the various pieces of equipment. An operation selection valve 66 selects whether the hydraulic fluid will flow to the winching system or the grinding system. As stated earlier, the operation selection valve 66 prevents both systems from being operated simultaneously. If the boom winch is being retrofitted onto an existing chipper, this operation selection valve 66 will have to be added as well as the control valves for the winching system and the associated hydraulic lines between the operation selection valve 66 the ram 16, the rope puller motor 24 and the reservoir tank 64. It serves as the point at which the winching system ties into the existing chipper hydraulic system.

If the operation selection valve 66 is selected to the winching system the fluid will travel to the winch control panel 18 where the winch control valve 68 and the ram control valve 70 are located. These valves adjustably control the flow and direction the fluid will travel to their respective equipment.

If the operation selection valve 66 is selected to the grinding system the fluid will travel to the grinder control panel where the grinder jaw ram control valve 72 and the feed roller control valve 74 are located. These valves adjustably control the flow and direction the fluid will travel to their respective equipment, the grinder jaw ram 76 and the feed rollers.

The benefits and advantages of the present invention will now be discussed in reference to a complete operation of felling a tree, retrieving its foliage and feeding it into the chipper where the winching chipper is located at a distance away from the tree and without a clean line of sight to the tree. (FIG. 14) A snatch block is affixed to a secure anchor point such as a tree. One end of a rope is affixed partway up the trunk of the tree to be cut, then run around the snatch block and to the boom winch. Alternatively when there is a clear line of sight, the rope may be looped to the trunk or doubled back to the chipper and secured there. (This feature is used when the rope strength is to be doubled.) The end of the rope is then operationally connected to the boom winch. Since the rope is not stored on the boom winch but rather is separate (usually in a basket or pail) one worker need only pick up the end of the rope and walk and climb it to the desired attachment point on the tree trunk while the other worker operationally connects the other end. This is a quick operation and saves time. The boom mast swivels horizontally for line alignment and once the line is fixed to the tree trunk, the boom arm is pivoted to set the desired vertical angle for the rope. The winch swivels horizontally which shifts the winch (horizontally as well as vertically) and automatically compensates for the fine angle adjustment for the line into the winch. (This changes as the tree is continually bent to the desired cutting and falling angle.)

The winch is run to pull the tree to the desired lean. As this is done the winch operator can "feel" the condition of the tree, whether it be rotten or lively. As the tree cutter makes his notches, cuts and back cuts the winch operator can increase the pull on the tree to monitor its angle and ensure it falls as desired. With additional pull the tree can be further directed as the trunk severs. The boom arm may be adjusted accordingly and the tree may now be dragged directly to the chipper without any break in the operation. By the time the tree cutter returns to the chipper with his chainsaw, the downed tree is already there.

Upon arrival at the chipper, the tree end of the line may be removed and located towards the cut end of the tree. The boom arm may be raised and the winch operated to drag the tree into the chipping chamber. Larger trees can be cut into manageable sections and then raised into the chipper with the boom winch.

Although parts (not all) of this operation can be done with a drum style winch, it necessitates the coupling of a second length of line to the first length of line on the drum winch, and after the winch has retrieved its first length of line (wound fully on the drum), the lines are uncoupled, the drum winch reversed and the first length of line extended (fully unwound from the drum). The first and second lengths of line are then recoupled and the process is repeated. This is a time consuming process. Since the drum winches are not self aligning and vertically adjustable the angle it retrieves the lines from is limited by where the chipper can physically be located. This is not an optimal arrangement, nor can it load the foliage into the chipper chamber.

Although discussed as using the anchor point and snatch block to to get the rope to the tree when there is no clear line of sight, since the rope is of an extremely long length (commonly more than 600 feet) it may be looped around at least one other anchor point (usually another tree) to change the angle of line pull on the tree even when there is a clear line of sight. This is necessary when the tree has an unfavorable lean to it. The angle of line pull on the tree is also used to direct the fall line of the tree.

Figure 9:
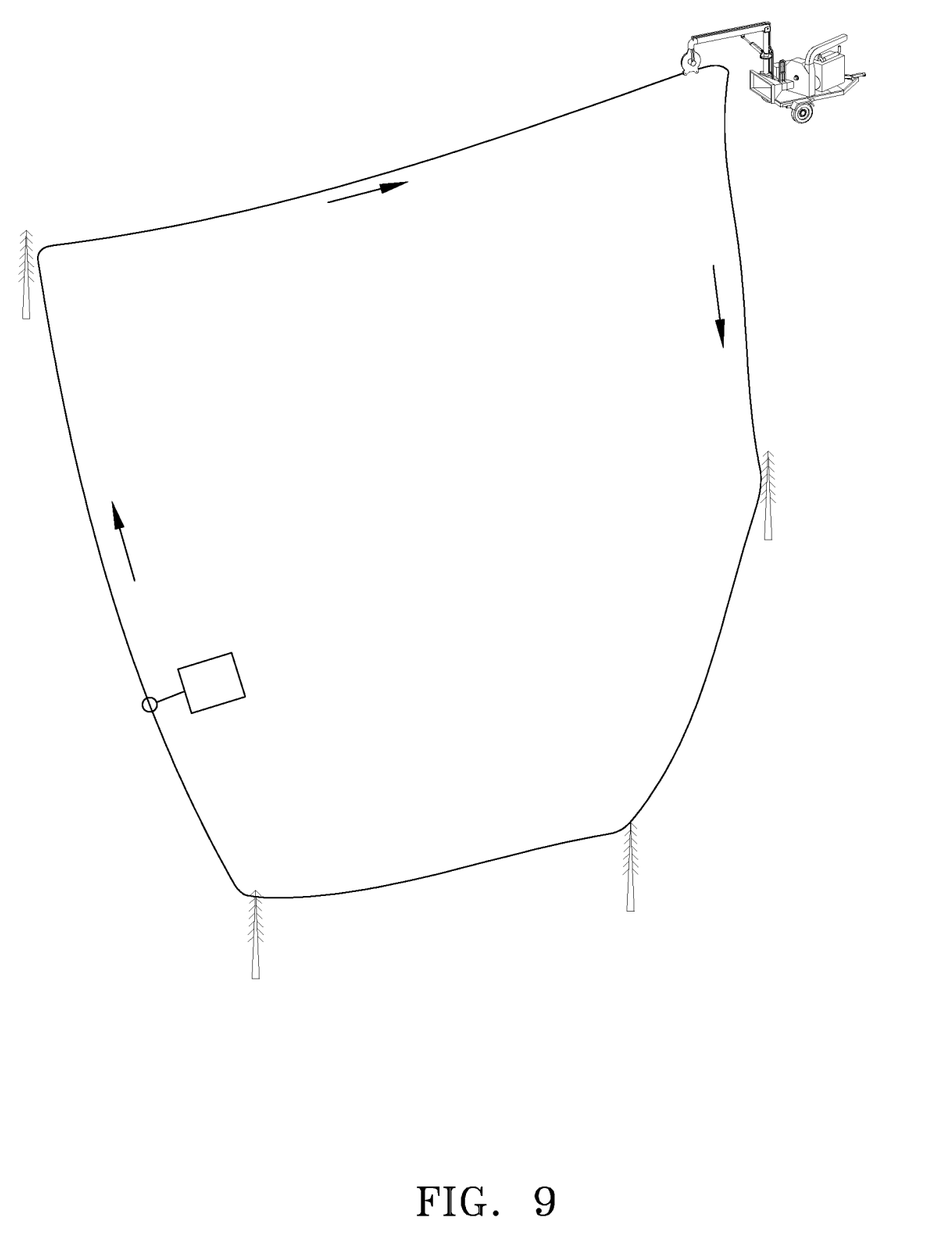
FIG. 9 is a representative view of the winching chipper; in one of a debris collection configuration.

Perhaps one of the most important aspects of the apparatus is that with the continuous line feed feature, the two line ends of the rope may be connected to form a loop that may be run around trees with blocks so as to make a continually circling line to which tarps of foliage or pieces of small brush can be connected and dragged to the chipper. Since the boom winch apparatus can retrieve knotted lines, loops can be made in the line to which the tarps or foliage may be connected. (FIG. 9)

While certain features and aspects have been described with respect to exemplary embodiments, one skilled in the art will recognize that numerous modifications are possible.

Moreover, while the procedures of the methods and processes described herein are described in a particular order for ease of description, unless the context dictates otherwise, various procedures may be reordered, added, and/or omitted in accordance with various embodiments. Moreover, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. For example, although depicted as having the mounting or anchor point of the boom mast behind the grinder chute, in alternate embodiments the boom mast may be mounted on top or beside the grinder chute. These and other such mountings may be utilized, provided that the mounting point is behind the leading edge of the grinder chute and that the boom arm extends in front and above the grinder chute. Consequently, it will be appreciated that the invention is intended to cover all modifications and equivalents within the scope of the following claims.

Having thus described the invention, what is claimed as new and desired to be secured by Letters Patent is as follows:

1. A winching apparatus adapted for connection to a wood chipping machine, comprising:
    a linear boom mast having an upper end and a lower end, said lower end mounted on said wood chipping machine behind a grinder unit;
    a vertically pivotable boom arm having a distal end and a proximal end, said distal end rotationally attached to said upper end of said boom mast for horizontal rotation of said boom arm;
    a continual uptake, hydraulic, rope puller mounted for vertical swiveling motion on said proximal end of said boom arm;
    a winching hydraulic system operatively connected to said rope puller; and
    wherein said proximal end of said boom arm extends above and beyond a front edge of said grinder chute of said wood chipping machine; and
    wherein said wood chipping machine has a chipper hydraulic system for the operation of said wood chipping machine.

2. The winching apparatus on a wood chipping machine of claim 1 further comprising;
    an upper boom mast; and
    a lower boom mast;
    wherein said upper boom mast and said lower boom mast are freely rotatably connected to form said boom mast so as to allow for said boom arm to self align in the horizontal plane to a load attached by a rope to said rope puller.

3. The winching apparatus on a wood chipping machine of claim 2 further comprising:
    a double acting ram having a upper end and a lower end, said lower end affixed to said upper boom mast and said upper end affixed to said boom arm;
    wherein said ram is capable of raising and lowering said boom arm and is operably connected to said winching hydraulic system.

4. The winching apparatus on a wood chipping machine of claim 1 further wherein said rope puller pivots freely about a linear axis of said boom arm so as to self align in the vertical plane to a load attached by a rope to said rope puller.

5. The winching apparatus on a wood chipping machine of claim 3 further wherein said rope puller pivots freely about a linear axis of said boom arm so as to self align in the vertical plane to a load attached by a rope to said rope puller.

6. The winching apparatus on a wood chipping machine of claim 5 further comprising a boom winch control panel for said winching hydraulic system, separate from a chipper control panel for the operation of the grinder unit.

7. The winching apparatus on a wood chipping machine of claim 6 wherein said winching hydraulic system, and said chipper hydraulic system share common hydraulic system components such as pumps and reservoir tanks.

8. The winching apparatus on a wood chipping machine of claim 1 wherein said boom arm extends beyond the front of a chipper chute so as to allow for the feeding of foliage directly into said chipper chute for chipping.

9. A winching apparatus for attachment to a wood chipping machine, comprising:
    a boom mast having an upper end and a lower end, said lower end mounted on said wood chipping machine;
    a boom arm having a distal end and a proximal end, said distal end pivotally attached to said boom mast;
    a continual uptake, hydraulic, rope puller mounted for swiveling motion on said proximal end of said boom arm;
    a winching hydraulic system operatively connected to said rope puller; and
    wherein said proximal end of said boom arm extends above and beyond a front edge of a grinder chute of said wood chipping machine.

10. The winching apparatus for attachment to a wood chipping machine of claim 9 further comprising:
    a hydraulic, double acting ram having a first end and a second end, said ram pivotally connected between said boom mast and said boom arm at each of its ends;
    a hollow lower boom mast;
    a hollow upper boom mast rotatably connected to said lower boom mast;
    a linear, tubular stiffening member inside said boom mast extending between said upper boom mast and said lower boom mast;

wherein said ram is extendable to raise said proximal end of said boom mast and retractable to lower said proximal end of said boom mast; and wherein said ram is operationally connect to said hydraulic system.

11. The winching apparatus for attachment to a wood chipping machine of claim 10, wherein said boom mast is rotationally mounted to said wood chipping machine to allow vertical rotation of said boom mast and horizontal rotation of said boom mast.

12. The winching apparatus for attachment to a wood chipping machine of claim 11 wherein said boom mast has a lower boom mast section and an upper boom mast section, said upper boom mast section rotationally coupled to said lower boom mast section.

13. The winching apparatus for attachment to a wood chipping machine of claim 9 wherein said rope puller comprises:

a generally planar backing plate;

a pair of circular convex disks conjoined about their midpoints with their convex sides opposing such that a tapered trough is formed there between, said disks rotationally mounted on said backing plate;

a pair of rope pulleys rotationally mounted on said backing plate below said disks;

a hydraulic motor operatively connected to said disks and to said winching hydraulic system;

wherein said motor provides a turning force to said disks.

14. The winching apparatus for attachment to a wood chipping machine of claim 13 wherein said winching hydraulic system is operatively connectable with a hydraulic grinding system of said wood chipping machine said winching hydraulic system having a valve selectable between operation of said grinding system or operation said winching system.

15. The winching apparatus for attachment to a wood chipping machine of claim 9 wherein said boom mast is affixed behind a leading edge of a grinder chute.

* * * * *